United States Patent [19]

Roberts et al.

[11] Patent Number: 4,785,216

[45] Date of Patent: Nov. 15, 1988

[54] HIGH POWERED WATER COOLED XENON SHORT ARC LAMP

[75] Inventors: Roy D. Roberts, Newark; John Kiss, San Jose, both of Calif.

[73] Assignee: ILC Technology, Inc., Sunnyvale, Calif.

[21] Appl. No.: 45,314

[22] Filed: May 4, 1987

[51] Int. Cl.⁴ .............. H01J 61/06; H01J 61/30; H01J 61/52
[52] U.S. Cl. .............. 313/32; 313/24; 313/36; 313/39; 313/113
[58] Field of Search .......... 313/32, 22, 23, 24, 313/35, 36, 39, 12, 113

[56] References Cited

U.S. PATENT DOCUMENTS

| 3,064,153 | 11/1962 | Gage | 313/22 |
| 4,599,540 | 7/1986 | Roberts | 313/113 X |

Primary Examiner—David K. Moore
Assistant Examiner—K. Wieder
Attorney, Agent, or Firm—Thomas E. Schatzel

[57] ABSTRACT

An arc lamp of the type having an internally integral reflector including an electrode which has an inlet passageway which deliver fluid to a point below the electrode tip and also has an outlet passageway to withdraw fluid from the electrode. The arc lamp further includes a housing which has an internal cavity which houses the body of the arc lamp. The internal cavity of the housing has a spiral passageway which directs fluid around the body of the lamp for improved cooling efficiency.

12 Claims, 1 Drawing Sheet

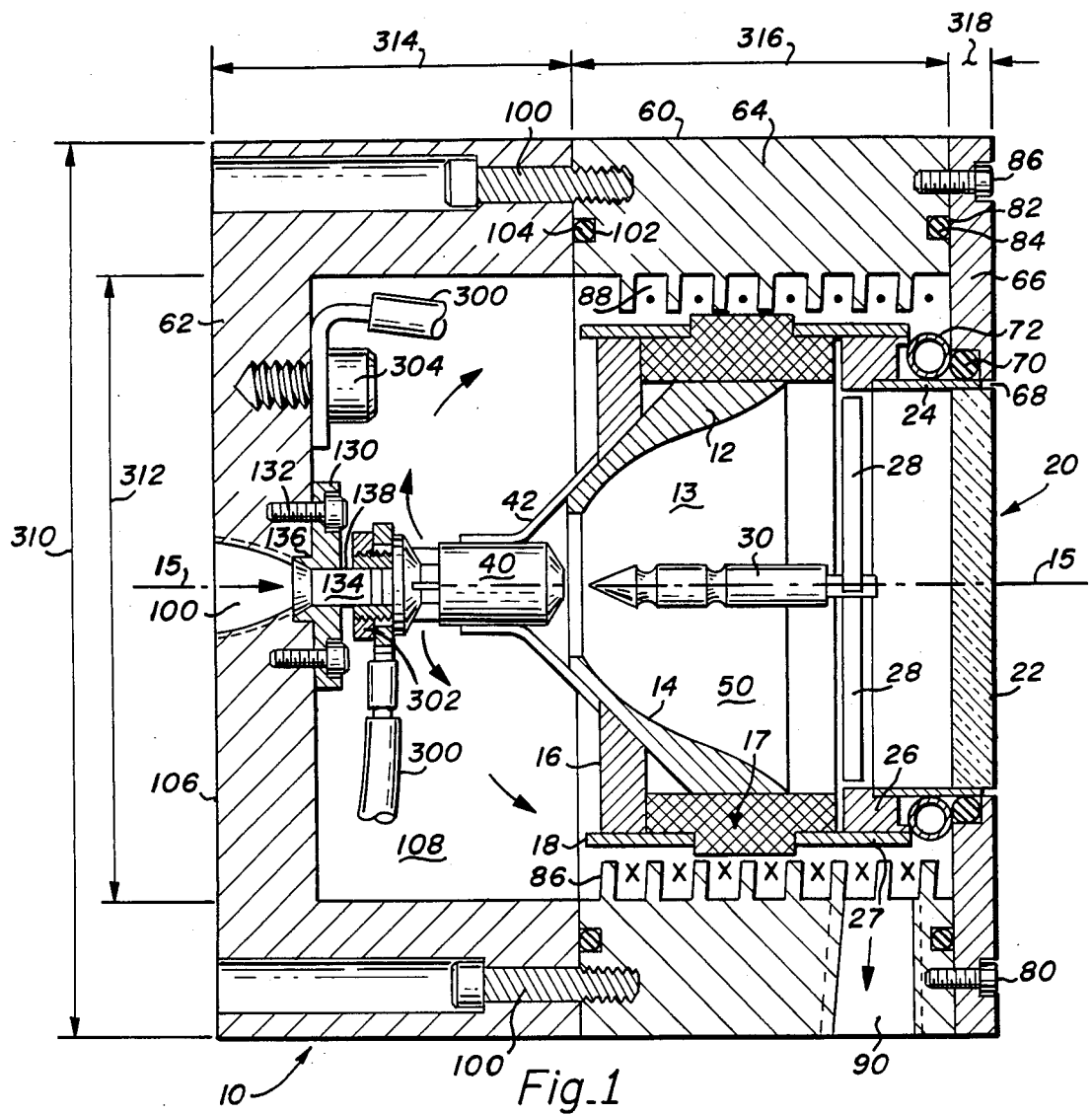
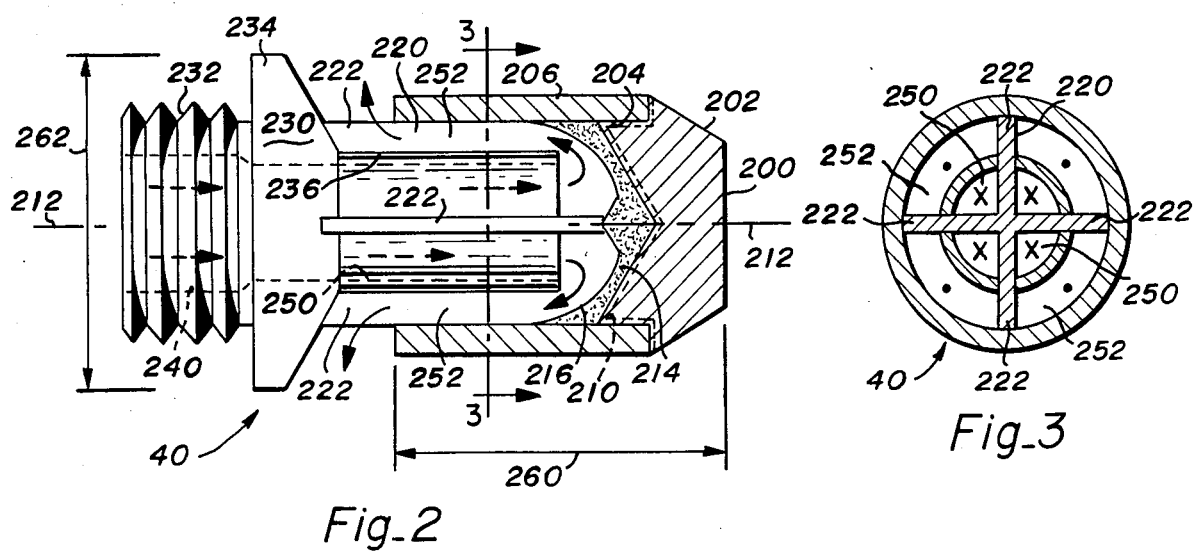
Fig. 1
Fig. 2
Fig. 3

HIGH POWERED WATER COOLED XENON SHORT ARC LAMP

BACKGROUND OF THE INVENTION

1. Field of the Invention

The present invention relates generally to arc lamps, and more specifically to arc lamps of the type which have short arc gaps and integral, internal reflectors.

2. Description of the Prior Art

It is well known to utilize ceramic lamps having short arc gaps to provide compact yet intense sources of light. Such lamps are utilized for example, in medical and industrial endoscopes and for material studies. The lamps can also be used as search lights for outerspace and undersea vehicles. Such lamps include a sealed chamber which contains a gas pressurized to several atmospheres, an anode and cathode mounted along the central axis of the concave chamber to define an arc gap, an integral concave reflector which serves to collimate light generated at the arc gap, and a window at the mouth of the chamber to permit external transmission of the collimated light from the lamp.

There are many applications where it is desirable to obtain the greatest intensity of light as possible. In order to achieve greater light intensity, more power must be applied to the ceramic lamps. The ceramic lamps of the prior art were limited to about one thousand watts and produced a peak beam candle power of three million candellas. Efforts to increase the light intensity by increasing the power resulted in overheating and damage to the lamp. In order to increase the power of the lamps, a way must be found which provides greater cooling.

Xenon lamps have been developed which use water cooling. However, xenon lamps are very fragile making them unsuitable for rugged environments such as in outerspace or undersea. The high pressure xenon lamps are subject to explosion and are very dangerous. In addition, high power xenon lamps are very bulky, usually four inches in diameter by eighteen inches long. An outside reflector must be added around the lamp to direct light and thus further increases the size. Ceramic type arc lamps have an internal reflector and are much more compact in size, but as yet, they have not been water cooled.

SUMMARY OF THE INVENTION

It is therefore an object of the present invention to provide a ceramic-type arc lamp which can produce greater light intensity.

It is another object of the present invention to provide a water cooled ceramic arc lamp.

Briefly, in the preferred embodiment, the present invention includes an outer body formed of a dielectric material, a concave metal reflector fitted within the body to define a curved reflecting wall symmetrical about a central axis of the lamp, a transparent window assembly sealingly mounted to the body transverse to the central axis to maintain pressurized gas within the space encompassed by the curved reflector and to pass collimated light from the lamp, and first and second opposed electrodes mounted to extend along said central axis. The first electrode has an inlet passageway to deliver fluid to a point below the first electrode tip and also has an outlet passageway to withdraw fluid from the first electrode.

The invention further includes a housing having an internal cavity with a window aperture. The body of the lamp fits inside the internal cavity and the window assembly is sealingly mounted to the window aperture. The housing has an inlet aperture connected to the inlet passageway and an outlet aperture. The housing also has spiral walls which direct fluid in a spiral pattern around the body of the lamp.

It is an advantage of the present invention in that it provides a ceramic arc lamp which can produce greater light intensity.

It is another advantage of the present invention in that it provides a water cooled ceramic arc lamp.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a cross-sectional view of a lamp of the present invention;

FIG. 2 is a cross-sectional view of an electrode of the present invention; and

FIG. 3 is a cross-sectional view of the electrode of FIG. 2 taken along line 3—3.

DETAILED DESCRIPTION OF THE PREFERRED EMBODIMENT

FIG. 1 shows a cross-sectional view of a lamp of the present invention and is designated by the general reference number 10. The lamp 10 includes a body 12 formed of a metallic material, such as nickel, which includes a hollow cavity 13 which defines an integral internal reflector 14. The reflector 14 is symmetrical about a longitudinal central axis 15 of the lamp. The reflector 14 may be parabolic, eliptical, or aspherical in shape to provide a particularly desired collimation of light. Typically, the reflector 14 has a deposited reflective metal coating thereon.

A donut-shaped base 16 is shaped to fit around the body 12. Base 16 is metallic and is brazed to body 12. A body ring 17 is sized to fit around the body 12 and abuts base 16. Body ring 17 is made of a dielectric material, such as ceramic. A metal band 18 is shaped to fit around base 16 and body ring 17. Note that body ring 17 has a cutout ledge portion to receive band 18. Band 18 is tungsten inert gas welded to base 16 and brazed to body ring 17.

A window assembly 20 is comprised of a transparent circular window 22 formed, for example, of a sapphire disk. The outer periphery of window 22 is sealingly surrounded by a flange member 24 which has an inside diameter which snuggly receives the window 22. A metallic spacer ring 26 is interposed between the flange member 24 and the mouth of the body 12. A cylindrical metal band 27 overlappingly surrounds the spacer ring 26 and the body ring 17 to secure the spacer ring 26 to the body 12. The metal band 27 fits into a cutout ledge portion of body ring 17 and is brazed to body ring 17. Window 22, flange member 24, spacer ring 26 and metal band 27 comprise window assembly 20.

The window assembly 20 further includes three support struts 28 which are secured at their radial outward ends to spacer ring 26. The struts 28 are positioned to extend radially inward across the face of window 22 toward the axis 15. The struts 28 are electrically conductive and are fixed, as by brazing, to the spacer ring 26. At their radially inward ends, the struts 28 support a rod-shaped electrode 30, which in turn, extends along the axis 15 toward the focal point of reflector 14. Preferrably, electrode 30 is circular in cross-section and, at its distal end, tapers to a tip adjacent the focal point of reflector 14.

An electrode 40 extends along the axis 15 of the lamp from a base 42 a location adjacent the focal point of reflector 14. The distance between the tip of electrode 30 an tip of the electrode 40 defines the arc gap. In practice, the arc gap distance ranges from greater than about 0.025 inches to less than about 0.125 inches. Base 42 connects electrode 40 to the body 12. Base 42, electrodes 30 and 40, body 12, base 16, body ring 17, metal band 18 and window assembly 20 comprise an arc lamp assembly 50.

The arc lamp assembly 50 is fitted inside a housing assembly 60. Housing assembly 60 is comprised of a housing base 62, a spiral housing member 64, and a housing plate 66. Housing plate 66 is disk-shaped and formed of brass. Plate 66 has a circular window aperture 68 centered about axis 15 which is sized to receive window 22. Aperture 68 is countersunk on the inner surface of plate 66 in order to receive flange member 24 and an O-ring 70. O-ring 70 fits snuggly between flange member 24 and plate 66 to form a seal. An extension spring 72 sits between plate 66 and spacer ring 26. Spring 72 loops around the outside of spacer ring 26 and is shown in cross section in FIG. 1. Spacer ring 26 has a countersunk portion to receive the spring 70 and hold it in position against the plate 66.

Plate 66 is attached to spiral housing member 64 by means of a plurality of screws 80. Spiral housing member 64 is cylindrically shaped about axis 15 and is formed out of plastic. Member 64 has a channel 82 for receiving an O-ring 84 which forms a seal between member 64 and plate 66. Member 64 has a spiral wall 86 which winds in a thread-like pattern symmetrically about axis 15 on the inner surface of member 64. The spiral wall 86 is formed such that the arc lamp assembly 50 fits snuggly inside of the spiral wall 86. The arc lamp assembly 50, member 64, and spiral wall 86 form a spiral passageway 88 which winds around arc lamp assembly 50. Member 64 has an outlet aperture 90 which connects the end of passageway 88 with the outside surface of member 64.

Member 64 is attached to housing base 62 by means of a plurality of screws 100. Member 60 has a channel 102 formed symmetrically about axis 15 for holding an O-ring 104. Ring 104 forms a seal between member 64 and housing base 62.

Housing base 62 is cylindrically shaped and has an end wall 106. Housing base 62 is made of aluminum and is positioned symmetrically about axis 15. A cylindrical inner cavity 108 of housing base 62 is adjacent passageway 88 of spiral housing 64. Housing base 62 has an inlet aperture 110 symmetrically located about axis 15 which passes through end wall 106.

A conduit plate 130 is attached to the inner side of the end wall 106 of housing base 62 by means of a plurality of screws 132. Conduit plate 130 is a disk-shaped plate having a channel section 134 which is symmetrically located about axis 15. Conduit plate 130 has a first stem section 136 which is formed to fit snuggly into inlet aperture 110. A second stem section 138 extends into inner cavity 108. Channel section 134 passes through conduit plate 130 via the first stem section 136 and the second stem section 138.

FIG. 2 shows a detailed cross-sectional view of electrode 40. Electrode 40 has a face section 200 which is cylindrical in shape and formed of two percent thoriated tungsten metal. Face section 200 has a bevelled section 202 on its outer face and a ledge section 204 on its inner face which is sized to receive a cylindrical copper sleeve 206. The inner face of face section 200 has a conical cavity 210 symmetrically located about a central axis 212 of electrode 40. During manufacture, the face of conical cavity 210 is coated with a film of nickel oxide 214. A cusil paste 216 is then added and molded into a parabolic shape having a mound section at its center to direct fluid flow evenly across the molded shape.

A copper fin section 220 is sized to fit inside of the sleeve 206 and its end abuts the cusil paste section 216. The fin section 220 is cross-shaped having four vane members 222.

A cylindrical nozzle 230 has a thread section 232, a flange section 234, and a nozzle stem section 236. The nozzle 230 is formed of nickel plated carbon steel and has a conduit section 240 which runs through the length of nozzle 230 about axis 212. The nozzle stem section 236 has four slots which run lengthwise, parallel to axis 212, and are sized such that fin section 220 slides over nozzle stem section 236 and is brazed to it. The nozzle 230 and fin section 220 are then brazed to sleeve 206. Note that the nozzle stem section 236 is shorter than fin section 220 such that the inside of sleeve 206 is divided into four compartments, each of which has an inlet passageway 250 and an outlet passageway 252.

In a preferred embodiment, dimension 260 is 0.650 inches and dimension 262 is 0.436 inches.

FIG. 3 shows a cross-sectional view of electrode 40 taken along line 3—3 of FIG. 2.

Returning now to FIG. 1, the conduit section 240 of nozzle 230 is sized to slidably receive the second stem section 138 of conduit plate 130. Note, as shown in FIG. 2, that the conduit section 240 narrows to provide a stop for the end of the second stem section 138. Channel section 134 is connected with conduit section 240. An electrical wire 300 is connected to thread section 232 of electrode 40 and is held in place by a jam nut 302. The other end of wire 300 is attached to housing base 62 by means of a screw 304. In a preferred embodiment, dimension 310 is 4.500 inches, dimension 312 is 3.200 inches, dimension 314 is 1.900 inches, dimension 316 is 1.950 inches and dimension 318 is 0.200 inches.

The operation of lamp 10 may now be understood. The hollow cavity 13 is filled with pressurized inert gas, such as xenon. A power source is connected across housing base 62 and plate 66 to provide power to the lamp 10. The lamp 10 is illuminated when the breakdown voltage is exceeded across the arc gap, thereby resulting in an illuminating flow of electrons between the electrode 30 and the electrode 40, respectively. The typical current flow across the arc gap ranges from about one to two hundred amperes.

When the lamp 10 is in operation, a water cooling system comprised of a pump and heat exchanger is connected to lamp 10. The flow of water through the lamp 10 is indicated by arrows in the various drawing figures. Water is pumped into inlet aperture 110 at a rate of four gallons per minute. See FIG. 1. The water then flows through the channel section 134 of conduit plate 130 and into the conduit section 240 of nozzle 230. See FIG. 2. The water travels inside nozzle 230, between the vanes 222 of fin section 220 and impinges upon the cusil paste section 216 on the inner face of the face section 200. The flow of water is then diverted by the shape of the cusil paste section 216 radially outward and changes direction one hundred eighty degrees and flows out between sleeve 206, vanes 222, and the nozzle stem section 236 of nozzle 230. FIG. 3 shows the flow of water in electrode 40 with the X's representing flow into the paper and the dots representing flow out of the paper.

Returning now to FIG. 1, the water flows out of electrode 40 and fills inner cavity 108 of housing base 62. Next, the water flows into spiral housing member 64 and begins flowing through spiral passageway 88 between spiral wall 86. The water flow winds around the lamp assembly 50 and exits lamp 10 though outlet aperture 90. In FIG. 1, the dots represent water flowing out of the page and the X's representing water flowing into the page. After the water exits the aperture 90, it is passed through a heat exchanger to reduce its temperature and a pump and is then recycled back through inlet aperture 110.

The water cooled arc lamp 10 provides improved performance over prior art ceramic to metal sealed arc lamps. The water cooling feature of the present invention greatly dissipates the heat generated inside the lamp assembly 50. Note that the cool water impinges on the inner face of electrode 40 immediately upon entering the lamp 10. Face 200 of electrode 40 is the hottest portion of the lamp and the unique configuration of the flow into and out of the electrode 40 greatly reduces the temperature. The vanes 222 act to effectively dissipate the electrode heat load along the length of the vanes 222 and thus allows the cooling water to absorb heat more efficiently from the electrode face. It also prevents the water from forming a boiling water film near the electrode section 216. After cooling the electrode 40, the water circulates around the entire lamp assembly 50. The spiral flow increases the cooling efficiency of the lamp.

The result of this increased cooling efficiency is to greatly increase the power and intensity of the lamp 10. Prior art ceramic to metal arc lamps were limited by temperature constraints to about one thousand watts (fifty amps at twenty volts) and produced intensity up to three million candellas at peak beam candle power. At greater power levels, the lamps would overheat and burn out. The lamp 10 of the present invention is able to operate at six thousand watts (two hundred amps at thirty volts) and produces twenty million candellas at peak beam candle power. This is over a five fold increase in the intensity of the lamp.

The lamp 10 has additional features. During operation, the force of water entering electrode 40 exerts a forward force on the lamp assembly 50. The nozzle 230 is able to slide forward on the second stem section 138 of conduit plate 130. The forward force on assembly 50 firmly seats the spring 72, acting as biasing means, between plate 66 and spacer ring 26. This ensures that a good electrical connection occurs between plate 66 and electrode 30.

In the preferred embodiment, purified water of two hundred fifty kiloohms is used. The purified water prevents electrical arc-over between metal band 18 and 27. However, water of less purity may be used due to the lamp's unique design. The ceramic body ring 17 has a raised portion between bands 18 and 27 which helps prevent arc-over. It is also believed that the spiral flow of water between metal band 27 and base 42 helps inhibit arc-over.

It can also be seen that the present invention provides a water cooled arc lamp which is compact in size. The cylindrical housing 60 is water tight and self-contained and provides protection for lamp assembly 50. The water inside the housing 60 helps to cushion the lamp 50. The self contained-lamp 10 is readily adaptable for use in outerspace or undersea.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An arc lamp comprising:
a body formed of a dielectric material;
a concave reflector fitted within the body to define a curved reflecting wall symmetrical about a central axis;
a transparent window assembly sealingly mounted to the body transverse to said central axis to maintain pressurized gas within the space encompassed by the curved reflector and to pass collimated light from the lamp;
first and second opposed electrodes mounted to extend along said central axis with the distal tip ends of said electrodes being spaced apart from one another in opposed relationship to define an arc gap at the focal point of the concave reflector, and the first electrode having an inlet passageway to deliver fluid to a point below a first electrode tip and having an outlet passageway connected to said inlet passageway to withdraw fluid from the first electrode;
electrical connection means connected to the respective electrodes to convey a flow of electrical current to the electrodes; and
a housing having an internal cavity containing the body, reflector, and electrodes and having a window aperture to sealingly mount the window assembly, the housing also having an inlet aperture connected to said light passageway of the first electrode and having an outlet aperture, such that fluid enters the inlet aperture and inlet passageway and passes through the outlet passageway into the region between the housing and the body and then passes out the outlet aperture.

2. The lamp of claim 1 further including,
a spiral passageway located in the region between the housing and the body.

3. The lamp of claim 1 further including,
a slidable connection means to connect said inlet aperture to said inlet passageway of the first electrode.

4. The lamp of claim 1 wherein,
the electrical connection means includes a conductive biasing means located between the window assembly and the housing.

5. The lamp of claim 1 wherein,
the first electrode is comprised of a face section having an internal cavity, a nozzle section mounted inside said internal cavity of said face section, said nozzle section containing said inlet passageway, such that said outlet passageway is formed between said nozzle section and said face section, and a plurality of vanes mounted inside said inlet and outlet passageways.

6. An arc lamp comprising:

an arc lamp assembly including a dielectric lamp body, an internal reflector mounted inside said lamp body, a base connected to said reflector, a window assembly connected to said body, a first electrode connected to said base and having an internal channel which passes a point proximate to a tip of said first electrode for carrying fluid into and out of said first electrode, and a second electrode connected to said window assembly;

a housing assembly having a cavity sized to contain the arc lamp assembly, a window aperture sized to sealingly receive said window assembly and having a fluid inlet aperture and a fluid outlet aperture;

an electrical connection means connected to the arc lamp assembly to convey electrical power to said arc lamp assembly; and a spiral passageway located in the region between the housing assembly and the arc lamp assembly.

7. An arc lamp comprising:

an arc lamp assembly including a dielectric lamp body, an internal reflector mounted inside said lamp body, a base connected to said reflector, a window assembly connected to said body, a first electrode connected to said base and having an internal channel which passes a point proximate to a tip of said first electrode for carrying fluid into and out of said first electrode, and a second electrode connected to said window assembly;

a housing assembly having a cavity sized to contain the arc lamp assembly, a window aperture sized to sealingly receive said window assembly and having a fluid inlet aperture and a fluid outlet aperture;

an electrical connection means connected to the arc lamp assembly to convey electrical power to said arc lamp assembly; and a slidable connection means to connect said fluid inlet aperture to said internal channel of the first electrode.

8. An arc lamp comprising:

an arc lamp assembly including a dielectric lamp body, an internal reflector mounted inside said lamp body, a base connected to said reflector, a window assembly connected to said body, a first electrode connected to said base an internal channel which passes a point proximate to a tip of said first electrode for carrying fluid into and out of said first electrode, and a second electrode connected to said window assembly;

a housing assembly having a cavity sized to contain the arc lamp assembly, a window aperture sized to sealingly receive said window assembly and having a fluid inlet aperture and a fluid outlet aperture; and an electrical connection means connected to the arc lamp assembly to convey electrical power to said arc lamp assembly, the electrical connection means includes a conductive biasing means located between said window assembly and the housing assembly.

9. An arc lamp comprising:

an arc lamp assembly including a dielectric lamp body, an internal reflector mounted inside said lamp body, a base connected to said reflector, a window assembly connected to said body, a first electrode connected to said base having an internal channel which passes a point proximate to a tip of said first electrode for carrying fluid into and out of first electrode, and a second electrode connected to said window assembly;

a housing assembly having a cavity sized to contain the arc lamp assembly, a window aperture sized to sealingly receive said window assembly and having a fluid inlet aperture and a fluid outlet aperture;

an electrical connection means connected to the arc lamp assembly to convey electrical power to said arc lamp assembly; and a plurality of vanes mounted inside said internal channel.

10. An arc lamp comprising:

an arc lamp assembly including a dielectric lamp body, an internal reflector mounted inside said lamp body, a base connected to said reflector, a window assembly connected to said body, said lamp body having a raised portion between said base and said window assembly for preventing arc-over, a first electrode connected to said base having an internal channel which passes a point proximate to a tip of said first electrode for carrying fluid into and out of said first electrode, and a second electrode connected to said window assembly;

a housing assembly having a cavity sized to contain the arc lamp assembly, a window aperture sized to sealingly receive said window assembly and having a fluid inlet aperture and a fluid outlet aperture; and an electrical connection means connected to the arc lamp assembly to convey electrical power to said arc lamp assembly.

11. An arc lamp comprising:

a body formed of a dielectric material;

a concave reflector fitted within the body to define a curved reflecting wall symmetrical about a central axis;

a transparent window assembly sealingly mounted to the body transverse to said central axis to maintain pressurized gas within the space encompassed by the reflector and to pass collimated light from the lamp; and first and second opposed electrodes mounted to extend along said central axis with the distal tip ends of said electrodes being spaced apart from one another in opposed relationship to define an arc gap at the focal point of the concave reflector, the first electrode is comprised of a face section having an internal cavity, a nozzle section mounted inside said internal cavity of said face section, said nozzle section containing an inlet passageway for delivering a flow of fluid to a point inside said internal cavity below a tip of the first electrode and an outlet passageway formed between said nozzle section and said face section, said outlet passageway being connected to said inlet passageway for withdrawing fluid from the first electrode.

12. An arc lamp comprising:

a body formed of a dielectric material;

a concave reflector fitted within the body to define a curved reflecting wall symmetrical about a central axis;

a transparent window assembly sealingly mounted to the body transverse to said central axis to maintain pressurized gas within the space encompassed by the curved reflector and to pass collimated light from the lamp; and first and second opposed electrodes mounted to extend along said central axis with the distal tip ends of said electrodes being space apart from one another in opposed relationship to define an arc gap at the focal point of the concave reflector, the first electrode is comprised of a face section having an internal cavity, a nozzle section mounted inside said internal cavity and containing an inlet passageway, an outlet passageway between said nozzle section and said face section and connected to said inlet passageway, said face section having a mound section located inside said internal cavity between said inlet passageway and said outlet passageway for diverting a flow of fluid from said inlet passageway to said outlet passageway.

* * * * *